United States Patent
Yu et al.

(10) Patent No.: US 11,425,769 B2
(45) Date of Patent: Aug. 23, 2022

(54) WIRELESS COMMUNICATION METHOD, TERMINAL, AUDIO COMPONENT, DEVICE, AND STORAGE MEDIUM

(71) Applicant: Spreadtrum Communications (Shanghai) Co., Ltd., Shanghai (CN)

(72) Inventors: Zhongxing Yu, Shanghai (CN); Guochu Chen, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 716 days.

(21) Appl. No.: 16/320,952

(22) PCT Filed: Jan. 21, 2019

(86) PCT No.: PCT/CN2019/072469
§ 371 (c)(1),
(2) Date: Jan. 25, 2019

(87) PCT Pub. No.: WO2020/133614
PCT Pub. Date: Jul. 2, 2020

(65) Prior Publication Data
US 2021/0337610 A1    Oct. 28, 2021

(30) Foreign Application Priority Data

Dec. 29, 2018 (CN) .......................... 201811644882.X

(51) Int. Cl.
*H04W 76/15* (2018.01)
*H04W 4/80* (2018.01)
(Continued)

(52) U.S. Cl.
CPC .......... *H04W 76/15* (2018.02); *H04L 5/0055* (2013.01); *H04R 1/1041* (2013.01); *H04W 4/80* (2018.02); *H04R 2420/07* (2013.01)

(58) Field of Classification Search
CPC ...... H04W 76/15; H04W 4/80; H04L 5/0055; H04R 1/1041; H04R 2420/07
(Continued)

(56) References Cited

U.S. PATENT DOCUMENTS 10,244,307 B1 * 3/2019 Tong .................. H04L 1/16
2008/0042229    10/2008 Sharna
(Continued)

FOREIGN PATENT DOCUMENTS

| CN | 106792454    | 5/2017 |
| CN | 107894881 A  | 4/2018 |

(Continued)

OTHER PUBLICATIONS

International Search Report of PCT/CN2019/072469.

*Primary Examiner* — Eugene Yun
(74) *Attorney, Agent, or Firm* — Blank Rome LLP

(57) ABSTRACT

A wireless communication method, a terminal, an audio component, an apparatus and a storage medium are disclosed. The method comprises: establishing a first communication link, communicating with a first audio component of an electronic device according to the first communication link; establishing a second communication link, communicating with a second audio component of the electronic device according to the second communication link; sending a first audio data packet to the first audio component and receiving first acknowledgement information fed back by the first audio component; receiving second acknowledgement information fed back after monitoring the terminal sending the first audio data packet by the second audio component; and performing data coordination processing according to the first acknowledgement information and the second acknowledgement information. Working loads on (Continued)

the primary earpiece of a Bluetooth headset or on a terminal is reduced by the embodiments of the present disclosure.

28 Claims, 5 Drawing Sheets

(51) Int. Cl.
*H04L 5/00* (2006.01)
*H04R 1/10* (2006.01)

(58) Field of Classification Search
USPC .......................................................... 455/41.3
See application file for complete search history.

(56) References Cited

U.S. PATENT DOCUMENTS

| | | | |
|---|---|---|---|
| 2018/0270175 A1 | 9/2018 | Kim et al. | |
| 2019/0034161 A1* | 1/2019 | Jo | G06F 1/1698 |
| 2020/0008124 A1* | 1/2020 | Gong | H04W 40/10 |
| 2020/0329052 A1* | 10/2020 | Goyal | H04W 12/106 |

FOREIGN PATENT DOCUMENTS

| | | |
|---|---|---|
| CN | 108337074 A | 7/2018 |
| CN | 108419228 | 8/2018 |
| CN | 108429949 A | 8/2018 |
| CN | 108769432 A | 11/2018 |
| CN | 109089330 A | 12/2018 |

\* cited by examiner

WIRELESS COMMUNICATION METHOD, TERMINAL, AUDIO COMPONENT, DEVICE, AND STORAGE MEDIUM

RELATED APPLICATIONS

This application is a U.S. National Stage Application of International Application No. PCT/CN2019/072469, filed on Jan. 21, 2019, which claims priority of Chinese Application No. 201811644882.X, filed on Dec. 29, 2018. The entire contents of those applications are incorporated herein by reference.

TECHNICAL FIELD

The present disclosure relates to the technical field of communications and particularly relates to a wireless communication method, a terminal, an audio component, an apparatus and a storage medium.

BACKGROUND

As the communication technologies are developing, Bluetooth communication has been widely used as a short-range wireless communication method. Bluetooth communication enables short-distance data exchange between a fixed device, a mobile device and a personal area network, making possible data exchange between Bluetooth-enabled devices anytime, anywhere. Thanks to the characteristics of Bluetooth communication, the Bluetooth technology is applicable to headsets.

Bluetooth headsets are gradually shifting from single-ear Bluetooth headsets to binaural Bluetooth ones. However, during the use of a binaural Bluetooth headset, if its function is realized in such manner that the primary Bluetooth earpiece controls the Bluetooth secondary earpiece, the primary Bluetooth earpiece will be overloaded. On the other hand, if data is sent to both of the Bluetooth earpieces by a terminal to realize the function of the binaural Bluetooth headset, there would be too much communication resource occupied.

SUMMARY

In view of the above, the present disclosure provides a wireless communication method, a terminal, an audio component, an apparatus and a storage medium that are capable of alleviating loads on a primary Bluetooth earpiece or on a terminal.

According to one aspect of the present disclosure, there is provided a wireless communication method comprising:
establishing a first communication link, communicating with a first audio component of an electronic device according to the first communication link;
establishing a second communication link, communicating with a second audio component of the electronic device according to the second communication link;
sending a first audio data packet to the first audio component and receiving first acknowledgement information fed back by the first audio component;
receiving second acknowledgement information fed back by the second audio component after monitoring the terminal sending the first audio data packet; and
performing data coordination processing according to the first acknowledgement information and the second acknowledgement information.

In a possible embodiment, performing data coordination processing according to the first acknowledgement information and the second acknowledgement information includes:
performing, in response to either of the first acknowledgement information and the second acknowledgement information being NACK, data resending; and
sending a second audio data packet to the first audio component,
content of the second audio data packet being the consistent with the first audio data packet.

In a possible embodiment, performing data coordination processing according to the first acknowledgement information and the second acknowledgement information includes:
performing data resending in response to not receiving either or both of the first acknowledgement information and the second acknowledgement information; and
sending a second audio data packet to the first audio component,
content of the second audio data packet being the consistent with the first audio data packet.

In a possible embodiment, performing data coordination processing according to the first acknowledgement information and the second acknowledgement information includes:
continuing data sending in response to the first acknowledgement information and the second acknowledgement information both being ACK; and
sending to the first audio component a third audio data packet which is a to-be-sent audio data packet to be sent in succession to the first audio data packet.

In a possible embodiment, establishing a second communication link, communicating with a second audio component of the electronic device according to the second communication link is followed by:
sending link information of the first communication link to the second audio component so that the second audio component monitors the first communication link according to the link information.

In a possible embodiment, the second acknowledgement information is
information that is sent at least once to occupy a first idle slot, wherein the first idle time slot is an idle time slot in a sending time slot for the first audio data packet, and/or
information that is sent at least once to occupy a second idle time slot, wherein the second idle time slot is an idle time slot in a receiving time slot for the first acknowledgement information.

In a possible embodiment, the method further comprises:
when a battery level difference value between the second audio component and the first audio component is greater than a preset battery level difference value, sending to the first audio component and the second audio component a primary/secondary switching instruction configured to instruct the first audio component to monitor the second communication link and instruct the second audio component to receive the first audio data packet.

In a possible embodiment, the method further comprises:
when a battery level of the first audio component and/or that of the second audio component are/is lower than a preset battery level threshold value, if there is no audio data to be sent at present, sending a standby instruction to the first audio component and/or the second audio component so that the first audio component and/or the second audio component enter/enters a standby mode.

In a possible embodiment, the first communication link and the second communication link have different connections, and power consumption of the second communication link is less than power consumption of the first communication link.

According to a further aspect of the present disclosure, there is provided a wireless communication method applicable to a second audio component of an electronic device. The method comprises:

establishing a second communication link, communicating with a terminal according to the second communication link;

monitoring a first audio data packet sent by the terminal to a first audio component of the electronic device via the first communication link; and sending second acknowledgement information to the terminal according to the first audio data packet so that the terminal performs data coordination processing according to first acknowledgement information sent by the first audio component and the second acknowledgement information.

In a possible embodiment, establishing a second communication link, communicating with a terminal according to the second communication link is followed by:

receiving link information of the first communication link sent by the terminal, monitoring the first communication link according to the link information.

In a possible embodiment, sending second acknowledgement information to the terminal according to the first audio data packet includes:

sending at least once the second acknowledgement information in a first idle time slot, wherein the first idle time slot is an idle time slot in a receiving time slot for receiving the first audio data packet; and/or sending at least once the second acknowledgement information in a second idle time slot, wherein the second idle time slot is an idle time slot in a receiving time slot for receiving the first acknowledgement information by the terminal.

In a possible embodiment, the first communication link and the second communication link are of different connection methods, and power consumption of the second communication link is less than power consumption of the first communication link.

According to a further aspect of the present disclosure, there is provided a terminal, the terminal comprising:

a first communication module configured to establish a first communication link and communicate with a first audio component of an electronic device according to the first communication link;

a second communication module configured to establish a second communication link and communicate with a second audio component of the electronic device according to the second communication link;

a first transmission module configured to send a first audio data packet to the first audio component and receive first acknowledgement information fed back by the first audio component;

a second transmission module configured to receive second acknowledgement information fed back by the second audio component after monitoring the terminal sending the first audio data packet; and an executing module configured to perform data coordination processing according to the first acknowledgement information and the second acknowledgement information.

In a possible embodiment, the executing module includes:

a first determination submodule configured to perform data resending in response to either of the first acknowledgement information and the second acknowledgement information being NACK; and a first sending submodule configured to send a second audio data packet to the first audio component, content of the second audio data packet being the consistent with the first audio data packet.

In a possible embodiment, the executing module includes:

a second determination submodule configured to perform data resending in response to not receiving either or both of the first acknowledgement information and the second acknowledgement information; and a second sending submodule configured to send a second audio data packet to the first audio component, content of the second audio data packet being the consistent with the first audio data packet.

In a possible embodiment, the executing module includes:

a third determination submodule configured to continue data sending in response to the first acknowledgement information and the second acknowledgement information both being ACK; and a third sending submodule configured to send to the first audio component a third audio data packet which is a to-be-sent audio data packet to be sent in succession to the first audio data packet.

In a possible embodiment, the second transmission module is further configured to send link information of the first communication link to the second audio component so that the second audio component monitors the first communication link according to the link information.

In a possible embodiment, the second acknowledgement information is information that is sent at least once to occupy a first idle slot, wherein the first idle time slot is an idle time slot in a sending time slot for the first audio data packet, and/or information that is sent at least once to occupy a second idle time slot, wherein the second idle time slot is an idle time slot in a receiving time slot for the first acknowledgement information.

In a possible embodiment, the second transmission module is configured further to, when a battery level difference value between the second audio component and the first audio component is greater than a preset battery level difference value, send to the first audio component and the second audio component a primary/secondary switching instruction that is configured to instruct the first audio component to monitor the second communication link and instruct the second audio component to receive the first audio data packet.

In a possible embodiment, the second transmission module is further configured to, when a battery level of the first audio component and/or that of the second audio component are/is lower than a preset battery level threshold value, if there is no audio data to be sent at present, send a standby instruction to the first audio component and/or the second audio component so that the first audio component and/or the second audio component enter/enters a standby mode.

In a possible embodiment, the first communication link and the second communication link are of different connection methods, and power consumption of the second communication link is less than power consumption of the first communication link.

According to a further aspect of the present disclosure, there is provided an audio component comprising:

a communication module configured to establish a second communication link and communicate with a terminal according to the second communication link;

a monitoring module configured to monitor a first audio data packet sent by the terminal to a first audio component of an electronic device via a first communication link; and a sending module configured to send second acknowledgement information to the terminal according to the first audio data packet so that the terminal performs data coordination processing according to first acknowledgement information sent by the first audio component and the second acknowledgement information.

In a possible embodiment, the monitoring module is further configured to receive link information of the first communication link sent by the terminal and monitor the first communication link according to the link information.

In a possible embodiment, the sending module is configured to send at least once the second acknowledgement information in a first idle time slot, wherein the first idle time slot is an idle time slot in a receiving time slot for receiving the first audio data packet; and/or send at least once the second acknowledgement information in a second idle time slot, wherein the second idle time slot is an idle time slot in a receiving time slot for receiving the first acknowledgement information by the terminal.

In a possible embodiment, the first communication link and the second communication link are of different connection methods, and power consumption of the second communication link is less than power consumption of the first communication link.

According to a further aspect of the present disclosure, there is provided a wireless communication apparatus comprising: a processor; and a memory configured to store instructions executable by the processor, wherein the processor is configured to carry out the afore-described methods.

According to a further aspect of the present disclosure, there is provided a non-volatile computer readable storage medium which stores computer program instructions, wherein the computer program instructions, when executed by a processor, carry out the afore-described methods.

The terminal according to the embodiments of the present disclosure is capable of establishing a first communication link, communicating with a first audio component of an electronic device according to the first communication link; establishing a second communication link. communicating with a second audio component of the electronic device according to the second communication link; sending a first audio data packet to the first audio component and receiving first acknowledgement information fed back by the first audio component; receiving second acknowledgement information fed back by the second audio component after monitoring the terminal sending the first audio data packet, and performing data coordination processing according to the first acknowledgement information and the second acknowledgement information. In this way, the terminal controls two audio components at the same time. For example, the terminal performs connection control over the first audio component and the second audio component. For another example, the terminal performs monitoring control over the second audio component. While wirelessly communicating with the two audio components, the terminal may send one piece of audio data to synchronize the audio data of the two audio components, thereby saving transmission resource of the terminal. In addition, by controlling the audio components by the terminal, working loads of the audio components are alleviated, and power consumption of the audio components reduced.

Additional features and aspects of the present disclosure will become apparent from the following description of exemplary examples with reference to the attached drawings.

BRIEF DESCRIPTION OF THE DRAWINGS

The drawings, which are included in the specification and form part of the specification, together with the description, show the exemplary embodiments, features, and aspects of the present disclosure and are used to explain the principles of the present disclosure.

DETAILED DESCRIPTION

Figure 1:
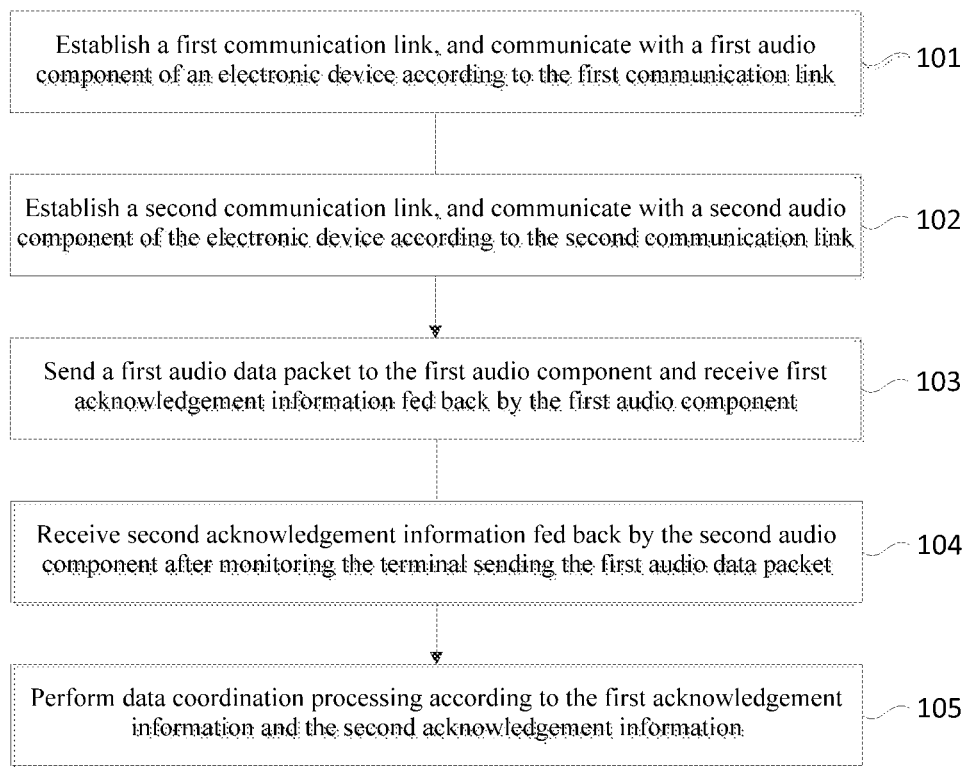
FIG. 1 shows a flowchart of a wireless communication method according to an embodiment of the present disclosure.

Various exemplary embodiments, features, and aspects of the present disclosure will be described in detail with reference to the drawings. The same reference numerals in the drawings denote the same or similar elements. Although the various aspects of the embodiments are illustrated in the drawings, the drawings are not necessarily drawn to scale unless otherwise specified.

The word "exemplary" is used exclusively herein to mean "serving as an example or embodiment, or being illustrative". Any embodiment described herein as "exemplary" is not necessarily to be construed as preferable or preferred.

Numerous details are set forth in the embodiments. It would be understandable to those skilled in the art that the present disclosure may be carried out without those details. In some of the embodiments, methods, means, components and circuits that are familiar to those skilled in the art are not described in detail in order to highlight the subject matter of the present disclosure.

In a wireless communication scheme provided by an embodiment of the present disclosure, a terminal establishes a communication connection with a first audio component via a first communication link, and establishes a communication connection with a second audio component via a second communication link. The terminal then sends a first audio data packet to the first audio component via the first communication link. The first audio component may receive the first audio data packet sent by the terminal, and return first acknowledgement information packet to the terminal according to the first audio data packet. The second audio component may obtain the first audio data packet by monitoring the terminal, and return second acknowledgement information packet to the terminal according to the first audio data packet. The terminal receives the first acknowledgement information packet and the second acknowledgement information packet, and may then determine a second audio data packet to be sent to the first audio component according to the time of receiving the first acknowledgement information packet and the time of receiving the second acknowledgement information packet and perform data coordination processing on the first audio component and the second audio component to synchronize audio data of the first audio component and audio data of the second audio component. In this way, the terminal can control two audio components at the same time. For example, the terminal performs connection control over the first audio component and the second audio component. For another example, the terminal performs monitoring control over the second audio component. While wirelessly communicating with the two audio components, the terminal may send one piece of audio data, and then determine a second audio data packet to be sent to the first audio component according to acknowledgement information sent by the two audio components. Thus, not only it is possible that the first audio component and the second audio component receive the same audio data, but also the working load of the terminal is reduced.

In the related technologies, if multiple audio components need to receive the same audio data, the terminal can send the audio data to the multiple audio components respectively. In this method, since the terminal needs to send the audio data to the multiple audio components, the multiple audio components take up multiple transmission resources of the terminal. In a case where the transmission resources are limited, such a phenomenon as transmission resource shortage or delayed transmission may occur, negatively influencing the transmission of the audio data. Also in the related technologies, the terminal may send audio data to a first audio component which then sends the received audio data to a second audio component, the second audio component being controlled by the first audio component. In this method, since the first audio component needs to control the second audio components, an excessively heavy load is imposed on the first audio component, causing the first audio component to consume processing resources and electrical power.

In view of the above, the embodiments of the present disclosure provide a wireless communication scheme which, on one hand, saves transmission resource of the terminal by sending from the terminal one copy of audio data so that the audio components in the electronic device obtain synchronized audio data, and on the other hand, alleviates a load on the audio components, effectively shortens the work time of the audio components, reduces the power consumption of the audio components, and extends their life spans. The terminal in the embodiments of the present disclosure may be an audio component such as a smart phone, a smart watch, a computer, a tablet, or the like. The first audio component and the second audio component may be audio playback devices such as speakers and Bluetooth headsets.

FIG. 1 shows a flowchart of a wireless communication method according to an embodiment of the present disclosure. As illustrated in FIG. 1, the method comprises:

Step 101 of establishing a first communication link, communicating with a first audio component of an electronic device according to the first communication link.

The electronic device may be an audio playback device such as a wireless headset and a wireless speaker. The electronic device may include a first audio component and a second audio component which may coordinate with each other when playing audio data to realize synchronized playing of the audio data. The terminal may establish a first communication link with the first audio component of the electronic device using a preset wireless communication method, and communicate with the first audio component via the first communication link. For example, the terminal may establish a wireless communication connection with the first audio component by standard Asynchronous Connectionless (ACL), which is a Bluetooth-based communication connection method in use for sending packet data.

Step 102 of establishing a second communication link, communicating with a second audio component of the electronic device according to the second communication link.

In this step, the terminal may establish a second communication link with a second audio component of the electronic device using a preset wireless communication method, and communicate with the second audio component via the second communication link. The connection method of the second communication link may be the same as the connection method of the first communication link. For example, the terminal may establish wireless communication connections with the first audio component and the second audio component respectively by standard ACL.

In a possible embodiment, the first and second communication links may be of different connection methods. In order to reduce power consumption of the communication process, power consumption of the second communication link may be less than power consumption of the first communication link. For example, the terminal may communicate with the first audio component by standard ACL and communicate with the second audio component by Bluetooth Low Energy (BLE) communication. Since the BLE has the advantage of significantly reducing power consumption and cost within the same communication range, the power consumption and the cost of the second audio component can be reduced.

Step 103 of sending a first audio data packet to the first audio component and receiving first acknowledgement information fed back by the first audio component.

When there is audio data to be sent by the terminal, the terminal may send a first audio data packet to the first audio component via the first communication link. After receiving the first audio data packet, the first audio component may return first acknowledgement information to the terminal according to the first audio data packet. The terminal receives the first acknowledgement information fed back by the first audio component.

Step 104 of receiving second acknowledgement information fed back after monitoring the terminal sending the first audio data packet by the second audio component.

After establishing a communication connection with the second audio component, the terminal may send link information of the first communication link to the second audio component so that the second audio component monitors the first communication link according to the link information. After obtaining the link information of the first communication link, the second audio component can actively monitor the first communication link so that it can obtain in time the first audio data packet sent by the terminal. If the second audio component obtains the first audio data packet sent by the terminal, the second audio component may send second acknowledgement information to the terminal according to the first audio data packet. The terminal receives the second acknowledgement information fed back by the second audio component.

In a possible embodiment, the second audio component may passively monitor the first communication link by, for example, following a monitoring instruction from the terminal. For example, the terminal may send a monitoring instruction to the second audio component when the current communication scenario meets a preset communication condition so that the second audio component starts monitoring the first communication link in accordance with the monitoring instruction. The preset communication condition includes any one of the following: the load on the second audio component is greater than a passive monitoring load threshold; and there is audio data to be sent within a preset time period that has been configured.

When a load on the second audio component is greater than a passive monitoring load threshold, which indicates that the current load on the second audio component is too heavy, if the first communication link is actively monitored, the second audio component will have to carry heavier load. In this case, the second audio component may start to monitor the first communication link in accordance with a monitoring instruction from the terminal, so as to bear lighter load. Correspondingly, if the terminal has audio data to be sent within a preset time period that has been configured, the terminal may notify the second audio component of monitoring the first communication link so as to lighten the load on the second audio component.

Step 105 of performing data coordination processing according to the first acknowledgement information and the second acknowledgement information.

After obtaining the first acknowledgement information and the second acknowledgement information, the terminal may perform data coordination processing according to the first acknowledgement information and the second acknowledgement information. When performing the data coordination processing, the terminal may determine whether there is a need to resend the audio data according to the first acknowledgement information and the second acknowledgement information to realize synchronized playing of the audio data by the first audio component and the second audio component.

The terminal needs to resend the audio data if one of the following situations occurs:

1) either of the first acknowledgement information and the second acknowledgement information received by the terminal is NACK (Negative ACKnowledgment);

2) the terminal does not receive either of the first acknowledgement information and the second acknowledgement information; and 3) both of the first acknowledgement information and the second acknowledgement information received by the terminal are ACK (ACKnowledgment).

The data may be resent in situation 1), i.e., when either of the first acknowledgement information and the second acknowledgement information is NACK. If either of the first acknowledgement information and the second acknowledgement information is NACK, the data packet received by the first audio component or that received by the second audio component may contain an error, or the data packet received by the first audio component and that received the second audio component are both erroneous. In that case, the terminal may send a second audio data packet to the first audio component, the second audio data packet being the consistent with the first audio data packet. Thereby, audio data resending is realized.

The data may be resent in situation 2), i.e., when either or both of the first acknowledgement information and the second acknowledgement information is/are not received. The terminal sends a second audio data packet to the first audio component, the second audio data packet being the consistent with the first audio data packet. Thereby, audio data resending is realized.

The data sending may continue in situation 3), i.e., when both of the first acknowledgement information and the second acknowledgement information received by the terminal are ACKs. The terminal may send a third audio data packet to the first audio component, and the third audio data packet may be an audio data packet to be sent in succession to the first audio data packet.

It should be noted that the first audio data packet may be the original data packet sent by the terminal to the first audio component, the second audio data packet may be a data packet that is resent by the terminal when resending the audio data and have the same content as the first audio data packet, and the third audio data packet may be a new data packet of the terminal to be sent after the first audio data packet.

Figure 2:
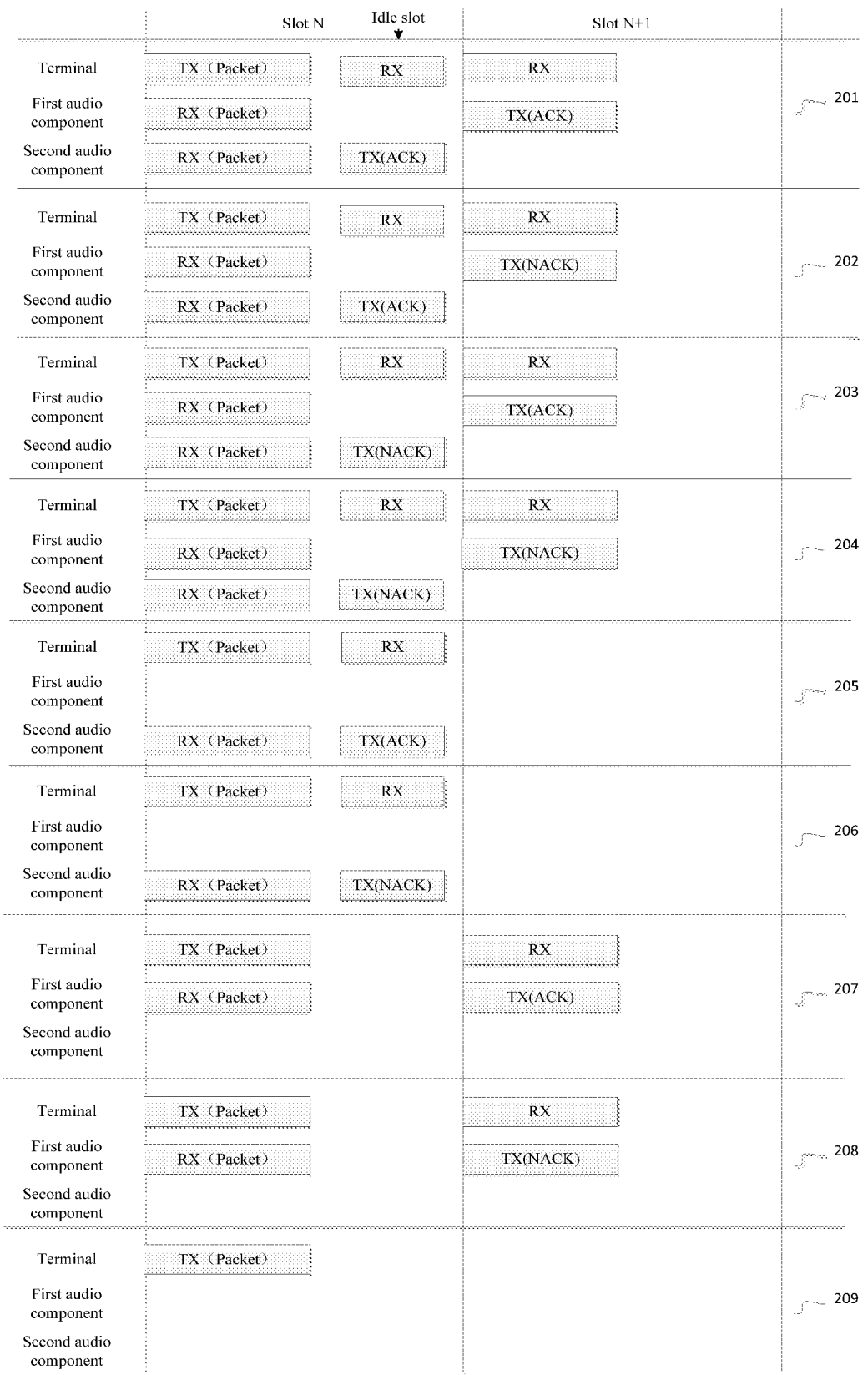
FIG. 2 shows a schematic diagram of data transmission between a terminal and a first audio component and a second audio component according to an embodiment of the present disclosure.

With reference to the afore-described three situations, FIG. 2 shows data transmission between a terminal and a first audio component and a second audio component according to an embodiment of the present disclosure.

The terminal may transmit the first audio data packet Packet to the first audio component via the first communication link in time slot N. In FIG. 2, TX represents a time slot in which data is sent, and RX represents a time slot in which data is received. In 201, in slot N, the terminal sends Packet in slot TX, the first audio component receives Packet in slot RX, and the second audio component receives Packet in slot RX. The second audio component then returns ACK to the terminal in the idle time slot of slot N. The first audio component sends ACK to the terminal in slot N+1. The terminal may send, in slot N+2, a new audio data packet to be sent. In 202, the first audio component receives Packet in slot RX, and the second audio component receives Packet in slot RX. The second audio component then returns ACK to the terminal in idle time slot in slot N. The first audio component sends NACK to the terminal in slot N+1. The terminal may resend Packet in slot N+2. In 203, the first audio component receives Packet in slot RX, and the second audio component receives Packet in slot RX. The second audio component then returns NACK to the terminal in idle time slot in slot N. The first audio component sends ACK to the terminal in slot N+1. The terminal may resend Packet in slot N+2. In 204, the first audio component receives Packet in slot RX, and the second audio component receives Packet in slot RX. The second audio component then returns NACK to the terminal in idle time slot in slot N. The first audio component sends NACK to the terminal in slot N+1. The terminal may resend Packet in slot N+2. In 205, the first audio component does not receive Packet in slot RX, and the second audio component receives Packet in slot RX. The second audio component then returns ACK to the terminal in idle time slot in slot N. The terminal may resend Packet in slot N+2. In 206, the first audio component receives Packet in slot RX, and the second audio component does not receive Packet in slot RX. The second audio component then returns NACK to the terminal in idle time slot in slot N. The terminal may resend Packet in slot N+2. In 207, the first audio component receives Packet in slot RX, and the second audio component does not receive Packet in slot RX. The first audio component then sends ACK to the terminal in slot N+1. The terminal may resend Packet in slot N+2. In 208, the first audio component receives Packet in slot RX, and the second audio component does not receive Packet in slot RX. The first audio component then sends NACK to the terminal in slot N+1. The terminal may resend Packet in slot N+2. In 209, the first audio component does not receive Packet in slot RX, and the second audio component does not receive Packet in slot RX. The terminal may resend Packet in slot N+2.

Benefiting from the embodiment of the present disclosure, the terminal can control the two audio components at the same time. For example, the terminal performs connection control over the first audio component and the second audio component. For another example, the terminal performs monitoring control over the second audio component. While wirelessly communicating with the two audio components, the terminal may send one piece of audio data, and then determine a second audio data packet to be sent to the first audio component according to acknowledgement information sent by the two audio components. Thus, not only the first audio component and the second audio component can receive the same audio data, but also the working load of the terminal can be reduced.

In a possible embodiment, the terminal may acquire battery level information of the first audio component and/or that of the second audio component in real time, and sends, according to the acquired battery level information, a standby instruction to the first audio component and/or the second audio component so that the first audio component and/or the second audio component enter/enters standby mode, when the battery level of the first audio component and/or that of the second audio component is lower than a preset battery level threshold value and if there is no audio data to be sent at present. Here, when the battery level of either of the first audio component and the second audio component is lower than a preset battery level threshold value, the terminal may control either or both of the first audio component and the second audio component to enter a standby mode, so that the audio component stands by when the battery level of the audio component is relatively low to save power of the audio component. Alternatively, the terminal may control the sending time of the audio data to be sent, and send the sending time to the second audio component so that the second audio component intermittently stands by. For example, when the terminal plays music, it may set slot N as the sending time for sending the first audio data, and before sending the first audio data, sends to the second audio component a standby instruction carrying the sending time via the second communication link so that the second audio component stands by in a time slot when the terminal does not have audio data to be sent, and the second audio component stops standing by and enters monitoring state in a slot when the terminal has audio data to be sent. In other words, the second audio component may intermittently standby according to the sending time in transmission from the terminal, and thereby save power.

In a possible embodiment, the terminal may acquire in real time battery level information of the first audio component and that of the second audio component, and conduct function interchange between the first audio component and the second audio component according to the battery level information. For example, when the battery level difference between the first audio component and the second audio component is greater than a preset battery level difference threshold value, the terminal sends, to the first audio component and the second audio component, a primary/secondary switching instruction which is configured to instruct the first audio component to monitor the second communication link and instruct the second audio component to receive the first audio data packet. For example, if the first communication link between the terminal and the first audio component is an ACL connection, and the second communication link between the terminal and the second audio component is a BLE connection, after the primary/secondary switching instruction is executed, the first communication link may then change to a BLE connection and the second communication link may change to an ACL connection. The terminal sends the first audio data packet to the second audio component via the second connection link, and the second audio component returns the second acknowledgement information to the terminal via the second connection link. The first audio component obtains the first audio data packet by monitoring the second communication link and returns the first acknowledgement information of the first audio data packet to the terminal via the first connection link. Thus, it is possible to realize function interchange between the first audio component and the second audio component in the case of a significant battery level difference between the first audio component and the second audio component, thereby reducing the battery level difference between the first audio component and the second audio component, and lowering the possibility that one of the audio components quickly runs out of power.

Figure 3:
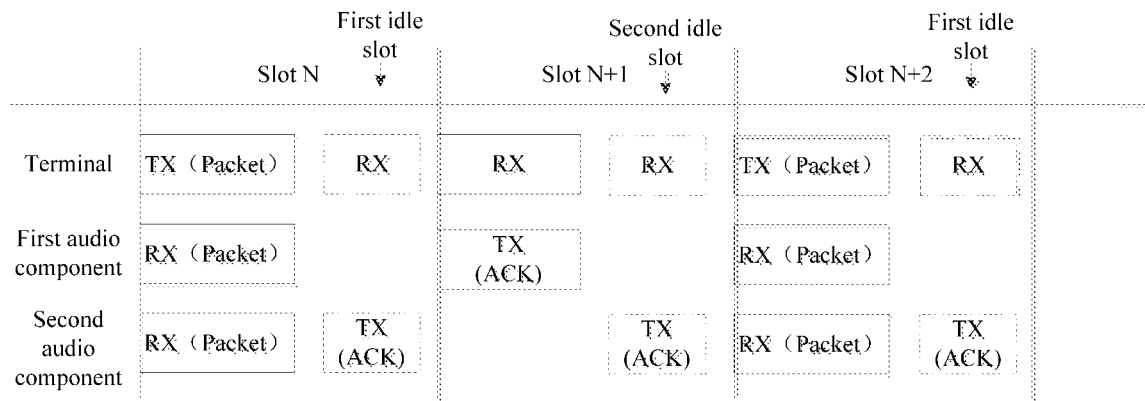
FIG. 3 shows a diagram of a time sequence of audio data sending and receiving according to an embodiment of the present disclosure.

In a possible embodiment, the second acknowledgment information returned by the second audio component and received by the terminal may be information sent at least once to occupy a first idle slot and/or information sent at least once to occupy a second idle time slot, wherein the first idle time slot is an idle time slot in a time slot in which the first audio data packet is sent, and the second idle time slot is an idle time slot in a time slot in which the first acknowledgement information is received. The idle time slot herein may be a time slot not used in the time slot in which audio data is transmitted. FIG. 3 shows a diagram of a time sequence of audio data sending and receiving according to an embodiment of the present disclosure.

The second audio component monitors in slot N the first audio data packet Packet sent by the terminal to the first audio component, and may send the second acknowledgement information such as ACK or NACK to the terminal in the first idle time slot of slot N. Alternatively, the second audio component may send the second acknowledgment information such as ACK or NACK, to the terminal in the second idle time slot of slot N+1. Alternatively, the second audio component may send the second acknowledgement information to the terminal in the first idle time slot of slot N and send the second acknowledgement information to the terminal again in the second idle time slot of slot N+1. Sending the second acknowledgement information by the second audio component to the terminal multiple times may increase the success rate of receiving the acknowledgement information by the terminal. Here, N is an integer.

Figure 4:
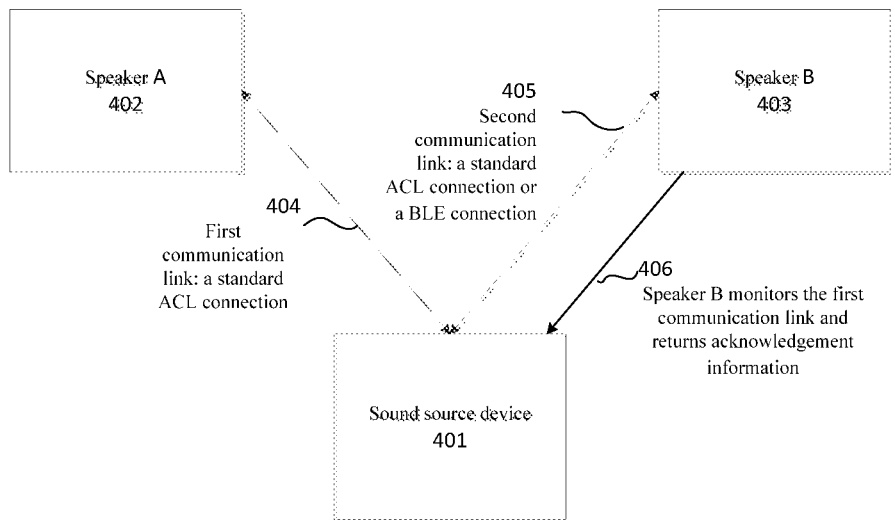
FIG. 4 shows a schematic diagram of an application scenario of a wireless communication method according to an embodiment of the present disclosure.

FIG. 4 shows an application scenario according to an embodiment of the present disclosure. The terminal may be a sound source device 401. The first audio component may be a speaker A402. The second audio component may be a speaker B403. The user may use the sound source device 401 to play music, and listen to the music played by the sound source device 401 with the speaker A402 and the speaker B403.

In this application scenario, the sound source device 401 may establish a communication connection with the speaker A 402 via the first communication link 404. The first communication link 404 may be a standard ACL connection. The sound source device 401 may establish a communication connection with the speaker B403 via the second communication link 405. The second communication link 405 may be an ACL or BLE connection. The BLE connection has the advantage of significantly reducing power consumption and cost within the same communication range, and thus is applicable to the second communication link 405 between the sound source device 401 and the speaker B403 so as to reduce power consumption and the cost of the speaker. After establishing wireless connections with the speaker A402 and the speaker B403 respectively, the sound source device 401 may send the link information of the first communication link 404 to the speaker B403, so that the speaker B403 can monitor the connection link according to the link information contained in the monitoring instruction. The sound source device 401 sends the first audio data packet to the speaker A402 via the first communication link 404. After receiving the first audio data, the speaker A402 returns the first acknowledgement information of the first audio data packet to the sound source device 401. In 406, the speaker B403 monitors the first communication link 404 to obtain the first audio data packet and sends the second acknowledgement information of the speaker A402 to the sound source device 401 in the idle time slot. After receiving the first acknowledgement information and the second acknowledgement information, the sound source device 401 determines whether or not the first acknowledgement information and the second acknowledgement information are both ACKs. If the first acknowledgement information and the second acknowledgement information are both ACKs, when there is audio data to be sent, the audio data packet carrying the audio data to be sent is transmitted to the speaker A402 in the next transmission time slot. Otherwise, the old packet is resent in the next transmission time slot, that is, an audio data packet identical to the first audio data packet is sent to the speaker A402. In this way, it can be realized that the speaker A402 and the speaker B403 simultaneously play the audio data sent by the sound source device 401.

Figure 5:
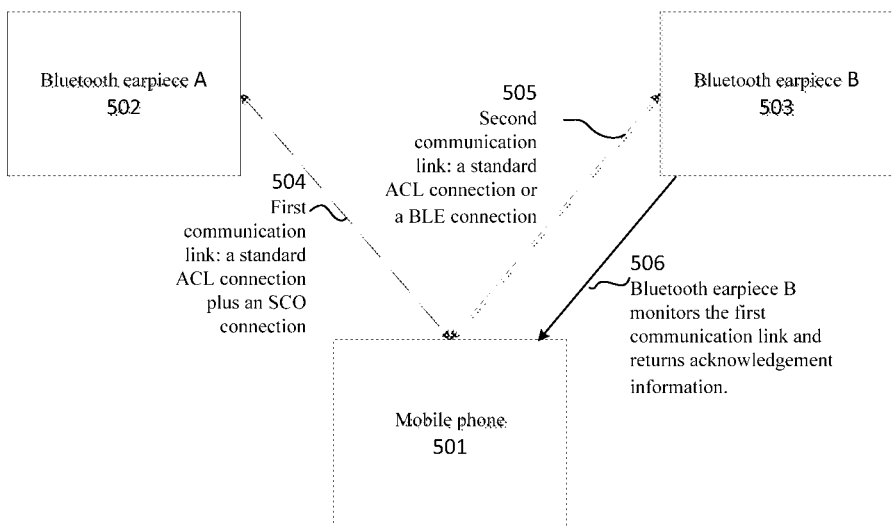
FIG. 5 shows a schematic diagram of an application scenario of a wireless communication method according to an embodiment of the present disclosure.

FIG. 5 shows an application scenario according to an embodiment of the present disclosure. The terminal may be a mobile phone 501. The first audio component may be a Bluetooth earpiece A502. The second audio component may be a Bluetooth earpiece B503. The user may make a call using the mobile phone 501, and listen to the call with the Bluetooth earpiece A502 and the Bluetooth earpiece B503.

In this application scenario, the mobile phone 501 may establish a communication connection with the Bluetooth earpiece A502 via the first communication link 504. The first communication link 504 may be a standard ACL connection and an SCO (Synchronous Connection Oriented) connection. The mobile phone 501 may establish a communication connection with the Bluetooth earpiece B503 via the second communication link 505. The second communication link 505 may be a standard ACL or BLE connection. After establishing wireless connections with the Bluetooth earpiece A502 and the Bluetooth earpiece B503 respectively, the mobile phone 501 may send to the Bluetooth earpiece B503 a monitoring instruction that may carry the link information of the first communication link 504, so that the Bluetooth earpiece B503 monitors the first communication link 504 according to the link information contained in the monitoring instruction. The mobile phone 501 sends the first audio data packet to the Bluetooth earpiece A502 via the first communication link 504. After receiving the first audio data, the Bluetooth earpiece A502 returns the first acknowledgement information of the first audio data packet to the mobile phone 501. In 506, the Bluetooth earpiece B503 may obtain the first audio data packet by monitoring the first communication link 504 and send the second acknowledgement information of the first audio data packet to the mobile phone 501 in the idle time slot. If the first acknowledgement information and the second acknowledgement information are both ACKs, the mobile phone 501 sends the audio data packet carrying the audio data to be sent. Otherwise, the mobile phone 501 sends the old packet, that is, it sends an audio data packet identical to the first audio data packet to the Bluetooth earpiece A502. In this way, audio synchronization of the Bluetooth earpiece A502 and the Bluetooth earpiece B503 can be realized.

Figure 6:
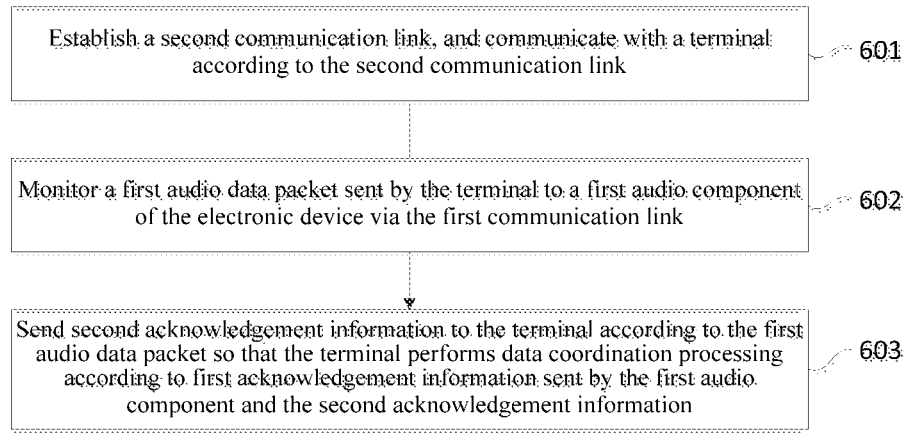
FIG. 6 shows a flowchart of a wireless communication method according to an embodiment of the present disclosure.

FIG. 6 shows a flowchart of a wireless communication method according to an embodiment of the present disclosure, which is applicable to a second audio component of an electronic device. The method comprises:

Step 601 of establishing a second communication link, communicating with a terminal according to the second communication link;

Step 602 of monitoring a first audio data packet sent by the terminal to a first audio component of the electronic device via the first communication link; and Step 603 of sending second acknowledgement information to the terminal according to the first audio data packet so that the terminal performs data coordination processing according to first acknowledgement information sent by the first audio component and the second acknowledgement information.

In a possible embodiment, the first and second communication links have different connection methods, power consumption of the second communication link being less than power consumption of the first communication link.

In a possible embodiment, establishing a second communication link, communicating with a terminal according to the second communication link may be followed by:

receiving link information of a first communication link sent by the terminal and monitoring the first communication link according to the link information.

In a possible embodiment, sending second acknowledgement information to the terminal according to the first audio data packet includes:

sending at least once the second acknowledgement information in a first idle time slot, wherein the first idle time slot is an idle time slot in a receiving time slot for receiving the first audio data packet; and/or sending at least once the second acknowledgement information in a second idle time slot, wherein the second idle time slot is an idle time slot in a receiving time slot for receiving the first acknowledgement information by the terminal.

The wireless communication process between the second audio component and the terminal may refer to the aforedescribed wireless communication of the terminal.

Figure 7:
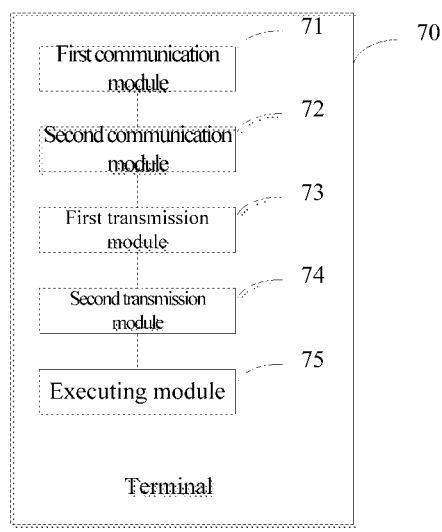
FIG. 7 shows a schematic diagram of a terminal according to an embodiment of the present disclosure.

FIG. 7 shows a schematic diagram of a terminal 70 according to an embodiment of the present disclosure. As shown in FIG. 7, the terminal 70 comprises:

a first communication module 71 configured to establish a first communication link and communicate with a first audio component of an electronic device according to the first communication link;

a second communication module 72 configured to establish a second communication link and communicate with a second audio component of the electronic device according to the second communication link;

a first transmission module 73 configured to send a first audio data packet to the first audio component and receive first acknowledgement information fed back by the first audio component;

a second transmission module 74 configured to receive second acknowledgement information fed back by the second audio component after monitoring the terminal sending the first audio data packet; and an executing module 75 configured to perform data coordination processing according to the first acknowledgement information and the second acknowledgement information.

In a possible embodiment, the first communication link and the second communication link have different connection methods; power consumption of the second communication link is less than power consumption of the first communication link.

In a possible embodiment, the executing module 75 includes:

a first determination submodule configured to perform data resending in response to either of the first acknowledgement information and the second acknowledgement information being NACK; and a first sending submodule configured to send a second audio data packet to the first audio component, wherein content of the second audio data packet is the consistent with the first audio data packet.

In a possible embodiment, the executing module 75 includes:

a second determination submodule configured to perform data resending in response to not receiving either or both of the first acknowledgement information and the second acknowledgement information; and a second sending submodule configured to send a second audio data packet to the first audio component, wherein content of the second audio data packet is the consistent with the first audio data packet.

In a possible embodiment, the executing module 75 includes:

a third determination submodule configured to continue data sending in response to the first acknowledgement information and the second acknowledgement information both being ACK; and a third sending submodule configured to send to the first audio component a third audio data packet which is a to-be-sent audio data packet to be sent in succession to the first audio data packet.

In a possible embodiment, the second transmission module 74 is further configured to send link information of a first communication link to the second audio component so that the second audio component monitors the first communication link according to the link information.

In a possible embodiment, the second transmission module 74 is further configured to, when the battery level difference between the second audio component and the first audio component is greater than a preset battery level difference value, send to the first audio component and the second audio component a primary/secondary switching instruction which is configured to instruct the first audio component to monitor the second communication link and instruct the second audio component to receive the first audio data packet.

In a possible embodiment, the second transmission module 74 is further configured to, when the battery level of the first audio component and/or that of the second audio component are/is lower than a preset battery level threshold value, if there is no audio data to be sent at present, send a standby instruction to the first audio component and/or the second audio component so that the first audio component and/or the second audio component enter/enters a standby mode.

Figure 8:
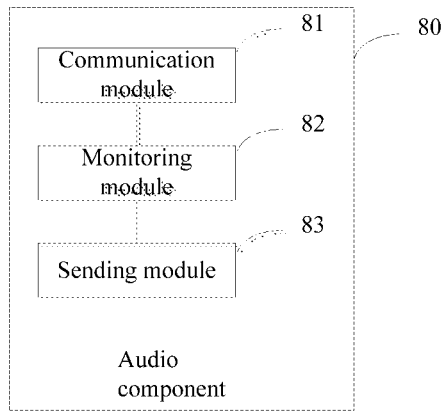
FIG. 8 shows a schematic diagram of an audio component according to an embodiment of the present disclosure.

FIG. 8 shows an audio component 80 of an electronic device according to an embodiment of the present disclosure. The audio component 80 comprises:

a communication module 81 configured to establish a second communication link, and communicate with a terminal according to the second communication link;

a monitoring module 82 configured to monitor a first audio data packet sent by the terminal to a first audio component of an electronic device via a first communication link; and a sending module 83 configured to send second acknowledgement information to the terminal according to the first audio data packet so that the terminal performs data coordination processing according to first acknowledgement information sent by the first audio component and the second acknowledgement information.

In a possible embodiment, the first and second communication links may have different connection methods; power consumption of the second communication link is less than power consumption of the first communication link.

In a possible embodiment, the monitoring module 82 is further configured to receive link information of a first communication link sent by the terminal and monitor the first communication link according to the link information.

In a possible embodiment, the sending module 83 is configured to send at least once the second acknowledgement information in a first idle time slot, wherein the first idle time slot is an idle time slot in a receiving time slot for receiving the first audio data packet; and/or send at least once the second acknowledgement information in a second idle time slot, wherein the second idle time slot is an idle time slot in a receiving time slot for receiving the first acknowledgement information by the terminal.

Figure 9:
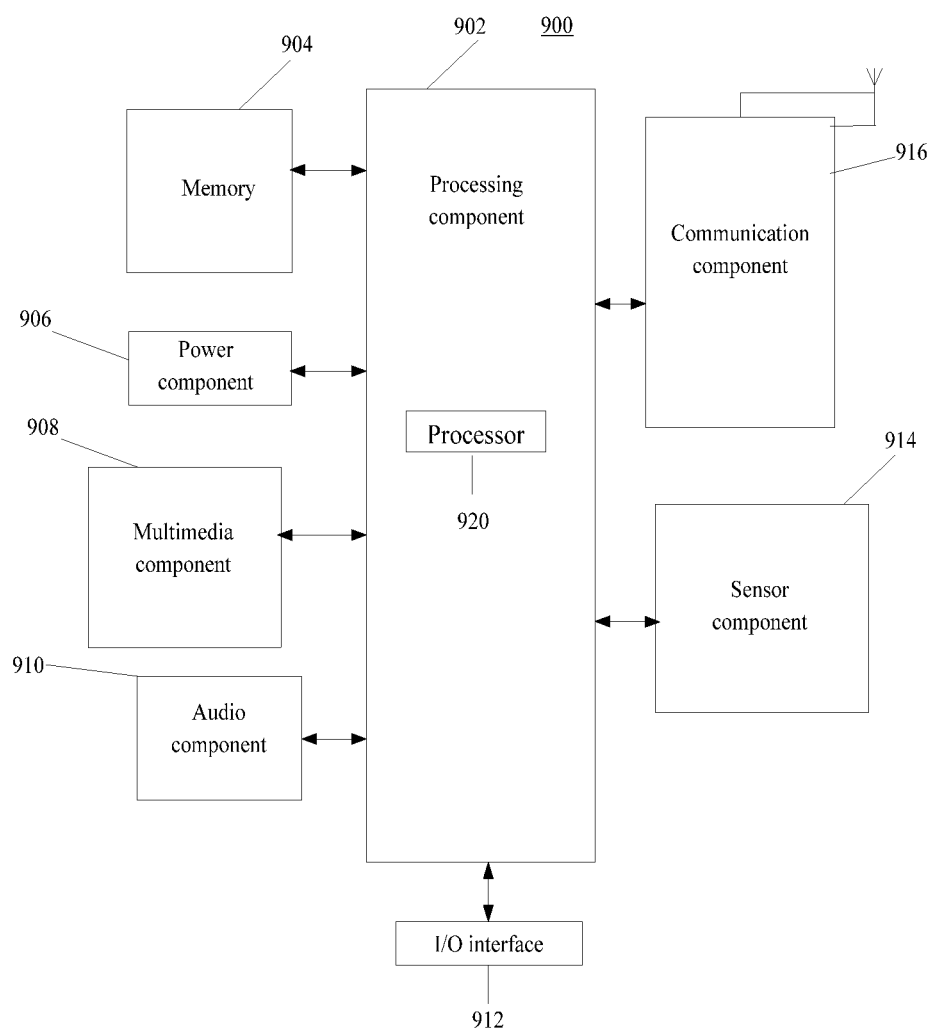
FIG. 9 shows a block diagram of a wireless communication apparatus according to an embodiment of the present disclosure.

FIG. 9 shows a block diagram of a wireless communication apparatus 900 according to an embodiment of the present disclosure. Apparatus 900 may be a mobile phone, a computer, a digital broadcasting terminal, a messaging device, a game console, a tablet device, medical equipment, fitness equipment, a personal digital assistant, or the like.

Referring to FIG. 9, apparatus 900 includes one or more of the following components: a processing component 902, a memory 904, a power component 906, a multimedia component 908, an audio component 910, an input/output (I/O) interface 912, a sensor component 914, and a communication component 916.

Processing component 902 is configured to control overall operations of apparatus 900, such as the operations associated with display, telephone calls, data communications, camera operations, and recording operations. Processing component 902 can include one or more processors 920 configured to execute instructions to perform all or part of the steps included in the above-described methods. In some embodiments, processing component 902 may include one or more modules configured to facilitate the interaction between the processing component 902 and other components. For example, processing component 902 may include a multimedia module configured to facilitate the interaction between multimedia component 908 and processing component 902.

Memory 904 is configured to store various types of data to support the operation of apparatus 900. Examples of such data include instructions for any applications or methods operated on or performed by apparatus 900, contact data, phonebook data, messages, pictures, video, etc. Memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

Power component 906 is configured to provide power to various components of apparatus 900. Power component 906 may include a power management system, one or more power sources, and any other components associated with the generation, management, and distribution of power in apparatus 900.

Multimedia component 908 includes a screen providing an output interface between apparatus 900 and the user. In some embodiments, the screen may include a liquid crystal display (LCD) and a touch panel (TP). If the screen includes the touch panel, the screen may be implemented as a touch screen to receive input signals from the user. The touch panel may include one or more touch sensors configured to sense touches, swipes, and gestures on the touch panel. The touch sensors may sense not only a boundary of a touch or swipe action, but also a period of time and a pressure associated with the touch or swipe action. In some embodiments, multimedia component 908 may include a front camera and/or a rear camera. The front camera and the rear camera may receive an external multimedia datum while apparatus 900 is in an operation mode, such as a photographing mode or a video mode. Each of the front camera and the rear camera may be a fixed optical lens system or may have focus and/or optical zoom capabilities.

Audio component 910 is configured to output and/or input audio signals. For example, audio component 910 may include a microphone (MIC) configured to receive an external audio signal when apparatus 900 is in an operation mode, such as a call mode, a recording mode, and a voice recognition mode. The received audio signal may be further stored in memory 904 or transmitted via communication component 916. In some embodiments, audio component 910 further includes a speaker configured to output audio signals.

I/O interface 912 is configured to provide an interface between processing component 902 and peripheral interface modules, such as a keyboard, a click wheel, buttons, and the like. The buttons may include, but are not limited to, a home button, a volume button, a starting button, and a locking button.

Sensor component 914 may include one or more sensors configured to provide status assessments of various aspects of apparatus 900. For example, sensor component 914 may detect at least one of an open/closed status of apparatus 900, relative positioning of components, e.g., the display and the keypad, of apparatus 900, a change in position of apparatus 900 or a component of apparatus 900, a presence or absence of user contact with apparatus 900, an orientation or an acceleration/deceleration of apparatus 900, and a change in temperature of apparatus 900. Sensor component 914 may include a proximity sensor configured to detect the presence of nearby objects without any physical contact. Sensor component 914 may also include a light sensor, such as a CMOS or CCD image sensor, for use in imaging applications. In some embodiments, sensor component 914 may also include an accelerometer sensor, a gyroscope sensor, a magnetic sensor, a pressure sensor, or a temperature sensor.

Communication component 916 is configured to facilitate wired or wireless communication between apparatus 900 and other devices. Apparatus 900 can access a wireless network based on a communication standard, such as Wi-Fi, 2G, 3G or 4G, or a combination thereof. In some embodiments, communication component 916 receives a broadcast signal or broadcast associated information from an external broadcast management system via a broadcast channel. In some embodiments, communication component 916 may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, or any other suitable technologies.

In some embodiments, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-volatile computer readable storage medium including instructions, such as those included in memory 904, executable by processor 920 of apparatus 900, for performing the above-described methods.

The present disclosure may be implemented by a system, a method, and/or a computer program product. The computer program product may include a computer readable storage medium having computer readable program instructions for causing a processor to carry out the aspects of the present disclosure stored thereon.

The computer readable storage medium can be a tangible device that can retain and store instructions used by an instruction executing device. The computer readable storage medium may be, but not limited to, e.g., electronic storage device, magnetic storage device, optical storage device, electromagnetic storage device, semiconductor storage device, or any proper combination thereof. A non-exhaustive list of more specific examples of the computer readable storage medium includes: portable computer diskette, hard disk, random access memory (RAM), read-only memory (ROM), erasable programmable read-only memory (EPROM or Flash memory), static random access memory (SRAM), portable compact disc read-only memory (CD-ROM), digital versatile disk (DVD), memory stick, floppy disk, mechanically encoded device (for example, punch-cards or raised structures in a groove having instructions recorded thereon), and any proper combination thereof. A computer readable storage medium referred herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal sent through a wire.

Computer readable program instructions described herein can be downloaded to individual computing/processing devices from a computer readable storage medium or to an external computer or external storage device via network, for example, the Internet, local area network, wide area network and/or wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium in the respective computing/processing devices.

Computer readable program instructions for carrying out the operations of the present disclosure may be assembler instructions, instruction-set-architecture (ISA) instructions, machine instructions, machine-related instructions, microcode, firmware instructions, state-setting data, or source code or object code written in any combination of one or more programming languages, including an object oriented programming language, such as Smalltalk, C++ or the like, and the conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on a remote computer or a server. In the scenario with remote computer, the remote computer may be connected to the user's computer through any type of network, including local area network (LAN) or wide area network (WAN), or connected to an external computer (for example, through the Internet connection from an Internet Service Provider). In some embodiments, electronic circuitry, such as programmable logic circuitry, field-programmable gate arrays (FPGA), or programmable logic arrays (PLA), may be customized from state information of the computer readable program instructions; the electronic circuitry may execute the computer readable program instructions, so as to achieve the aspects of the present disclosure.

Aspects of the present disclosure have been described herein with reference to the flowchart and/or the block diagrams of the method, device (systems), and computer program product according to the embodiments of the present disclosure. It will be appreciated that each block in the flowchart and/or the block diagram, and combinations of blocks in the flowchart and/or block diagram, can be implemented by the computer readable program instructions.

These computer readable program instructions may be provided to a processor of a general purpose computer, a dedicated computer, or other programmable data processing devices, to produce a machine, such that the instructions create means for implementing the functions/acts specified in one or more blocks in the flowchart and/or block diagram when executed by the processor of the computer or other programmable data processing devices. These computer readable program instructions may also be stored in a computer readable storage medium, wherein the instructions cause a computer, a programmable data processing device and/or other devices to function in a particular manner, such that the computer readable storage medium having instructions stored therein comprises a product that includes instructions implementing aspects of the functions/acts specified in one or more blocks in the flowchart and/or block diagram.

The computer readable program instructions may also be loaded onto a computer, other programmable data processing devices, or other devices to have a series of operational steps performed on the computer, other programmable devices or other devices, so as to produce a computer implemented process, such that the instructions executed on the computer, other programmable devices or other devices implement the functions/acts specified in one or more blocks in the flowchart and/or block diagram.

The flowcharts and block diagrams in the drawings illustrate the architecture, function, and operation that may be implemented by the system, method and computer program product according to the various embodiments of the present disclosure. In this regard, each block in the flowchart or block diagram may represent a part of a module, a program segment, or a portion of code, which comprises one or more executable instructions for implementing the specified logical function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagram and/or flowchart, and combinations of blocks in the block diagram and/or flowchart, can be implemented by dedicated hardware-based systems performing the specified functions or acts, or by combinations of dedicated hardware and computer instructions.

Although the embodiments of the present disclosure have been described above, it should be appreciated that the above descriptions are merely exemplary, not exhaustive, and that the disclosed embodiments are not limiting. A number of variations and modifications may occur to those skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to those skilled in the art.

What is claimed is:

1. A wireless communication method applicable to a terminal, wherein the method comprises:
    establishing a first communication link, communicating with a first audio component of an electronic device based on the first communication link;
    establishing a second communication link, communicating with a second audio component of the electronic device based on the second communication link;
    sending, via the terminal, a first audio data packet to the first audio component and receiving first acknowledgement information of the first audio data packet fed back by the first audio component to the terminal;
    receiving, via the terminal, second acknowledgement information of the first audio data packet fed back by the second audio component to the terminal after monitoring, via the second audio component, the first communication link to obtain the first audio data packet by the second audio component;
    performing data coordination processing based on the first acknowledgement information and the second acknowledgement information, and
    sending, to the second audio component through the second communication link:
    a standby instruction instructing the second audio component to stop monitoring the first audio data packet.

2. The method according to claim 1, wherein said performing data coordination processing based on the first acknowledgement information and the second acknowledgement information includes:
    performing data resending in response to either of the first acknowledgement information and the second acknowledgement information being NACK; and
    sending a second audio data packet to the first audio component,
    wherein content of the second audio data packet is the consistent with the first audio data packet.

3. The method according to claim 1, wherein said performing data coordination processing based on the first acknowledgement information and the second acknowledgement information includes:

performing data resending in response to not receiving either or both of the first acknowledgement information and the second acknowledgement information; and sending a second audio data packet to the first audio component, wherein content of the second audio data packet is the consistent with the first audio data packet.

4. The method according to claim 1, wherein said performing data coordination processing based on the first acknowledgement information and the second acknowledgement information includes:

continuing with data sending in response to the first acknowledgement information and the second acknowledgement information both being ACK; and sending to the first audio component a third audio data packet which is sent in succession to the first audio data packet.

5. The method according to claim 1, wherein after said establishing a second communication link, communicating with a second audio component of the electronic device based on the second communication link, the method further comprises:

sending link information of the first communication link to the second audio component so that the second audio component monitors the first communication link based on the link information.

6. The method according to claim 1, wherein the second acknowledgement information is information sent at least once to occupy a first idle slot, wherein the first idle time slot is an idle time slot in a sending time slot for the first audio data packet, and/or the second acknowledgement information is information sent at least once to occupy a second idle time slot, wherein the second idle time slot is an idle time slot in a receiving time slot for the first acknowledgement information.

7. The method according to claim 1, further comprising:

based on a battery level difference between the second audio component and the first audio component greater than a preset battery level difference value, sending to the first audio component and the second audio component a primary/secondary switching instruction instructing the first audio component to monitor the second communication link and instructing the second audio component to receive the first audio data packet.

8. The method according to claim 1, further comprises comprising:

based on a battery level of the first audio component and/or the second audio component lower than a preset battery level threshold value, sending the standby instruction to the first audio component and/or the second audio component so that the first audio component and/or the second audio component enters a standby mode in response to no audio data being sent at present.

9. The method according to claim 1, wherein the first communication link and the second communication link are of different link approaches, and power consumption of the second communication link is less than power consumption of the first communication link.

10. A wireless communication method, which is applicable to a second audio component of an electronic device, comprising:

establishing a second communication link, communicating with a terminal based on the second communication link;

monitoring, via the second audio component, a first communication link to obtain a first audio data packet by the second audio component sent by the terminal to a first audio component of the electronic device;

sending, via the second audio component, second acknowledgement information to the terminal based on the first audio data packet obtained by the second audio component, causing the terminal to perform data coordination processing based on first acknowledgement information sent by the first audio component to the terminal, and the second acknowledgement information, wherein the first acknowledgement information is based on the first audio data packet sent by the terminal to the first audio component; and receiving, from the terminal through the second communication link:

a standby instruction instructing the second audio component to stop monitoring the first audio data packet.

11. The method according to claim 10, wherein said establishing a second communication link, communicating with a terminal based on the second communication link is followed by:

receiving link information of a first communication link sent by the terminal and monitoring the first communication link based on the link information.

12. The method according to claim 10, wherein said sending second acknowledgement information to the terminal based on the first audio data packet includes:

sending at least once the second acknowledgement information in a first idle time slot, wherein the first idle time slot is an idle time slot in a receiving time slot for receiving the first audio data packet; and/or sending at least once the second acknowledgement information in a second idle time slot, wherein the second idle time slot is an idle time slot in a receiving time slot for receiving the first acknowledgement information by the terminal.

13. The method according to claim 10, wherein the first communication link and the second communication link are of different link approaches, and power consumption of the second communication link is less than power consumption of the first communication link.

14. A terminal comprising:

a processor; and a memory configured to store instructions executable by the processor, wherein the instructions cause the processor to:

establish a first communication link and communicate with a first audio component of an electronic device based on the first communication link;

establish a second communication link and communicate with a second audio component of the electronic device based on the second communication link;

send, via the terminal, a first audio data packet to the first audio component and receive first acknowledgement information of the first audio data packet fed back by the first audio component to the terminal;

receive, via the terminal, second acknowledgement information of the first audio data packet fed back by the second audio component to the terminal after monitoring, via the second audio component, the first communication link to obtain the first audio data packet by the second audio component;

perform data coordination processing based on the first acknowledgement information and the second acknowledgement information, and send, to the second audio component through the second communication link:
a standby instruction instructing the second audio component to stop monitoring the first audio data packet.

15. The terminal according to claim 14, wherein the instructions further cause the processor to:
perform data resending in response to either of the first acknowledgement information and the second acknowledgement information being NACK; and
send a second audio data packet to the first audio component,
wherein content of the second audio data packet is the consistent with the first audio data packet.

16. The terminal according to claim 14, wherein the instructions further cause the processor to:
perform data resending in response to not receiving either or both of the first acknowledgement information and the second acknowledgement information; and
send a second audio data packet to the first audio component, wherein content of the second audio data packet is the consistent with the first audio data packet.

17. The terminal according to claim 14, wherein the instructions further cause the processor to:
continue with data sending in response to the first acknowledgement information and the second acknowledgement information both being ACK; and
send to the first audio component a third audio data packet which is sent in succession to the first audio data packet.

18. The terminal according to claim 14, wherein the instructions further cause the processor to send link information of the first communication link to the second audio component so that the second audio component monitors the first communication link based on the link information.

19. The terminal according to claim 14, wherein
the second acknowledgement information is information sent at least once to occupy a first idle slot, wherein the first idle time slot is an idle time slot in a sending time slot for the first audio data packet, and/or
the second acknowledgement information is information sent at least once to occupy a second idle time slot, wherein the second idle time slot is an idle time slot in a receiving time slot for the first acknowledgement information.

20. The terminal according to claim 14, wherein the instructions further cause the processor to, based on a battery level difference between the second audio component and the first audio component greater than a preset battery level difference value, send to the first audio component and the second audio component a primary/secondary switching instruction instructing the first audio component to monitor the second communication link and instructing the second audio component to receive the first audio data packet.

21. The terminal according to claim 14, wherein the instructions further cause the processor to, based on a battery level of the first audio component and/or the second audio component lower than a preset battery level threshold value, and in response to no audio data being sent at present, send the standby instruction to the first audio component and/or the second audio component so that the first audio component and/or the second audio component enters a standby mode.

22. The terminal according to claim 14, wherein the first communication link and the second communication link are of different link approaches, and power consumption of the second communication link is less than power consumption of the first communication link.

23. A second audio component comprising:
a processor; and
a memory configured to store instructions executable by the processor,
wherein the instructions cause the processor to:
establish a second communication link and communicate with a terminal based on the second communication link;
monitor, via the second audio component, a first communication link to obtain a first audio data packet by the second audio component sent by the terminal to a first audio component of an electronic device;
send, via the second audio component, second acknowledgement information to the terminal based on the first audio data packet obtained by the second audio component so that the terminal performs data coordination processing based on first acknowledgement information sent by the first audio component to the terminal, and the second acknowledgement information, wherein the first acknowledgement information is based on the first audio data packet sent by the terminal to the first audio component; and
receive, from the terminal through the second communication link:
a standby instruction instructing the second audio component to stop monitoring the first audio data packet.

24. The second audio component according to claim 23, wherein the instructions further cause the processor to receive link information of a first communication link sent by the terminal, and monitor the first communication link based on the link information.

25. The second audio component according to claim 23, wherein the instructions further cause the processor to:
send at least once the second acknowledgement information in a first idle time slot, wherein the first idle time slot is an idle time slot in a receiving time slot for receiving the first audio data packet; and/or
send at least once the second acknowledgement information in a second idle time slot, wherein the second idle time slot is an idle time slot in a receiving time slot for receiving the first acknowledgement information by the terminal.

26. The second audio component according claim 23, wherein the first communication link and the second communication link are of different link approaches, and power consumption of the second communication link is less than power consumption of the first communication link.

27. A non-volatile computer readable storage medium which stores computer program instructions, wherein the computer program instructions, when executed by a processor, cause the processor to:
establish a first communication link, communicate with a first audio component of an electronic device based on the first communication link;
establish a second communication link, communicate with a second audio component of the electronic device based on the second communication link;
send, via the terminal, a first audio data packet to the first audio component and receive first acknowledgement information of the first audio data packet fed back by the first audio component to the terminal;
receive, via the terminal, second acknowledgement information of the first audio data packet fed back by the second audio component to the terminal after monitoring, via the second audio component, the first communication link to obtain the first audio data packet by the second audio component;

perform data coordination processing based on the first acknowledgement information and the second acknowledgement information, and send, to the second audio component through the second communication link:

a standby instruction instructing the second audio component to stop monitoring the first audio data packet.

28. A non-volatile computer readable storage medium which stores computer program instructions, wherein the computer program instructions, when executed by a processor, cause the processor to:

establish a second communication link, communicate with a terminal based on the second communication link;

monitor, via a second audio component, a first communication link to obtain a first audio data packet by the second audio component sent by the terminal to a first audio component of the electronic device;

send, via the second audio component, second acknowledgement information to the terminal based on the first audio data packet obtained by the second audio component, cause the terminal to perform data coordination processing based on first acknowledgement information sent by the first audio component to the terminal, and the second acknowledgement information, wherein the first acknowledgement information is based on the first audio data packet sent by the terminal to the first audio component; and receive, from the terminal through the second communication link:

a standby instruction instructing the second audio component to stop monitoring the first audio data packet.

* * * * *